(12) United States Patent
Abdel-Rahman

(10) Patent No.: US 11,945,828 B1
(45) Date of Patent: Apr. 2, 2024

(54) ELECTRONICALLY WEAKLY COUPLED 4,4'-DIVINYLAZOBENZENE-BRIDGED DIRUTHENIUM COMPLEX BEARING TWO Ru(CO)Cl (PiPr3)2 MOIETIES AS AN INORGANIC CATALYST

(71) Applicant: KING FAISAL UNIVERSITY, Al-Ahsa (SA)

(72) Inventor: Obadah Subhi Abdel-Rahman, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/534,330

(22) Filed: Dec. 8, 2023

(51) Int. Cl.
*C07F 15/00* (2006.01)

(52) U.S. Cl.
CPC .................. *C07F 15/0046* (2013.01)

(58) Field of Classification Search
CPC .................................... C07F 15/0046
See application file for complete search history.

(56) References Cited

U.S. PATENT DOCUMENTS 3,660,458 A    5/1972   Trotz et al.

OTHER PUBLICATIONS

Obadah S. Abdel-Rahman et al.; "1,4-Divinylphenylene-bridged diruthenium complexes with 2-hydroxypyridine- and 2- or 8-hydroxyquinoline-olate ligands"; From the journal Zeitschrift für Naturforschung B https://doi.org/10.1515/znb-2022-0303, Published by De Gruyter Mar. 8, 2023 (abstract only).
Ismail Warad et al.; "New catalysts for the chemoselective reduction of a, B-unsaturated ketones: Synthesis, spectral, structural and DFT characterizations of mixed ruthenium(II) complexes containing 2-ethene-1,3-bis(diphenylphosphino) propane and diamine ligands"; Polyhedron vol. 63, Oct. 31, 2013, pp. 182-188.
Obadah S. Abdel-Rahman et al.; "Polyelectrochromism and electronic coupling in vinylruthenium-modified carbazoles"; Journal of Organometallic Chemistry, vols. 849-850, Nov. 1, 2017, pp. 98-116, https://doi.org/10.1016/j.jorganchem.2017.05.010.
Jörg Maurer, et al.; "Divinylphenylene-Bridged Diruthenium Complexes Bearing Ru(CO)Cl(PiPr3)2 Entities"; Organometallics 2006, 25, 15, 3701-3712, Publication Date: Jun. 16, 2006 https://doi.org/10.1021/om0602660.
Hai-Jing Nie et al.; "Near-Infrared Electrochromism in Electropolymerized Metallopolymeric Films of a Phen-1,4-diyl-Bridged Diruthenium Complex"; Oct. 2014 Inorganic Chemistry 53(20) DOI:10.1021/ic5019967 Source PubMed.

*Primary Examiner* — Paul V Ward

(74) *Attorney, Agent, or Firm* — Nath, Goldberg & Meyer; Richard C. Litman

(57) ABSTRACT

An electronically weakly coupled 4,4'-divinylazobenzene-bridged diruthenium complex bearing two Ru(CO)Cl (P$^i$Pr$_3$)$_2$ moieties, its synthesis, and its use as a catalyst in organic processes.

10 Claims, 5 Drawing Sheets

ELECTRONICALLY WEAKLY COUPLED 4,4'-DIVINYLAZOBENZENE-BRIDGED DIRUTHENIUM COMPLEX BEARING TWO Ru(CO)Cl (PiPr3)2 MOIETIES AS AN INORGANIC CATALYST

BACKGROUND

1. Field

The present disclosure relates to a compound that is an electronically weakly coupled 4,4'-divinylazobenzene-bridged diruthenium complex bearing two Ru(CO)Cl (P$^i$Pr$_3$)$_2$ moieties, its synthesis, and its use as a catalyst for organic compounds.

2. Description of the Related Art

Since the reporting of ruthenium hydrido complexes of the type {[HRu(CO)Cl(PR$_3$)$_2$] (R=Ph, Me, cyclohexyl, $^i$Pr)} in the 1960s, considerable interest has been focused on the pivotal catalytic activates of such chemical families towards selective hydrogenation of terminal olefins and alkynes, the coupling of terminal alkynes with carboxylic acid-derived compounds, the dehydrogenation of alcohol to ketones, dialdehydes to lactones, and in particular on regio- and stereospecific insertion of the ruthenium-hydride bond into a terminal —C≡CH bond of the alkyne substrates to form the ruthenium-alkenyl type-families.

More recently, interest in (multi)ruthenium-alkenyl type-complexes has been intensively scrutinized in terms of redox chemistry, electronic coupling, electro switchable poly-electrochromic near infrared (NIR) dyes, tri-, tetra-, and hexametal-organic macrocycles and antiproliferative effects in tumor cell lines.

As these complexes have attracted widespread interest, divinylarylene-bridged diruthenium complexes of the general type [{Ru(CO)(Cl)(P$^i$Pr$_3$)$_2$}$_2$(μ—CH═CH—Ar—CH═CH—)] {Ar=bridging π-conjugated arylene linker} have been investigated and revealed to exhibit two consecutive, chemically and electrochemically, well-behaved, reversible one-electron oxidations at well-accessible potentials. The half-wave redox splitting, $\Delta E_{1/2} = E_{1/2}^{+/2+} - E_{1/2}^{0/+}$, between their two individual redox one-electron oxidations waves depends on the π-conjugated arylene linker "bridge" and ranged to be well-separated (strongly coupled) as in the case of five-membered 2,5-N-arylpyrroles- or -furanes- or -thiophenes heterocycles arylene linkers; moderately coupled as in 4,4'-biphenylenes, 2,2'-bipyridines, and many others arylene linkers; or weakly coupled as in the case of the enforced n-stacking of the two phenyl rings in para-[2.2]- or ortho-[2.1]-cyclophanes linkers.

Cross-coupling reactions play the most effective role in the development of the chemical industrial processes. Homogeneous catalysts of transition metal complexes are of great interest for synthesizing fine-chemical/specialty chemical/medical and pharmaceutical products for their high activity and modified chemo-, stereo- and regio-selectivity advantages within the widely used cross coupling reaction of C—C, C—O, C—N and C—S bonding. The most recent chemical transformation consumes high energy for selective productivity.

Azoarylenes and its similar related derivatives were intensively investigated and attracted enormous interest due to their straightforward derivatives synthesis step through classical homo-oxidative cross-coupling of aryl diazonium sails using Cu-catalyzed Sandmeyer-style reaction. Moreover, these chromophores usually show a strong π→π* transition in the UV-Vis regime which can be predictively tuned by introducing substituents on the aryl rings.

SUMMARY

The electrochemical electronic coupling, polyelectrochromic behavior, and spectro(electro)scopic features of bis (ruthenium-alkenyl) moieties incorporated into an azo-arylene bridge linker have been investigated as described herein. Accordingly, the present subject matter relates to a novel electronically weakly coupled 4,4'-divinylazobenzene-bridged diruthenium complex bearing two Ru(CO)Cl (P$^i$Pr$_3$)$_2$ moieties with the general formula [{Ru(CO)Cl (P$^i$Pr$_3$)$_2$}$_2$(μ—{CH═CH—C$_6$H$_4$}$_2$—N═N-4,4')], [dRuazobz]. This five-coordinated, square-pyramidal, 16-valence electrons (VeEs) type-complex [dRuazobz] was classically prepared by regio- and stereospecific insertion of two equivalent of the ruthenium-hydrido precursor HRu (CO)Cl(P$^i$Pr$_3$)$_2$ into the two terminal —C≡CH bonds of the corresponding 4,4'-diethynylazobenzene.

The complex [dRuazobz] was routinely characterized in a neutral state by classical IR, UV/Vis and NMR spectroscopy techniques, and in two different reachable oxidized states by IR, UV/Vis/NIR spectroelectrochemistry along with electrochemical techniques. The complex [dRuazobz] undergoes a single chemically and electrochemically reversible two-electrons oxidation redox wave referring to noteworthy negligible communication between the two remote redox-active end-groups. This complex shows strong polyelectrochromic behavior with at least two distinct states, one of which absorbs mostly in the Visible (Vis) regime (the neutral form), while the other one absorbs dominantly in the border of the Vis/NIR region (the mono- and dication forms).

First electrochemical oxidation under IR of [dRuazobz] led to gradually replace the neutral Ru(CO) stretching vibrational band into a pattern of two bands; the lower-energy shoulder band is very close to the neutral form while the other higher-energy band on the other hand is close to the fully oxidized [dRuazobz]$^{2+}$. This typical observation pattern confirms a weakly coupled Class I system of Robin-Day classification of MV states.

In an embodiment, the present subject matter relates to an electronically weakly coupled 4,4'-divinylazobenzene-bridged diruthenium complex bearing two Ru(CO)Cl (P$^i$Pr$_3$)$_2$ moieties having the formula I:

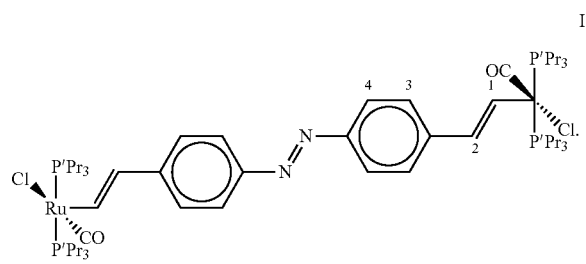

In another embodiment, the present subject matter relates to a compound that is a red solid.

In a further embodiment, the present subject matter relates to a metallic complex that may act as a catalyst.

In one more embodiment, the present subject matter relates to a method of making the 4,4'-divinylazobenzene-bridged diruthenium complex bearing two Ru(CO)Cl (P$^i$Pr$_3$)$_2$ moieties [dRuazobz], the method comprising: stirring HRu(CO)Cl(P$^i$Pr$_3$)$_2$ in CH$_2$Cl$_2$ to obtain a first reaction mixture; adding to the first reaction mixture a solution of 4,4'-diethynylazobenzene in CH$_2$Cl$_2$ to obtain a second reaction mixture; stirring the second reaction mixture for at least about 1 hour; removing the CH$_2$Cl$_2$ under reduced pressure to obtain a precipitate; washing, filtering, and drying the precipitate; and obtaining the 4,4'-divinylazobenzene-bridged diruthenium complex bearing two Ru(CO)Cl(P$^i$Pr$_3$)$_2$ moieties.

These and other features of the present subject matter will become readily apparent upon further review of the following specification.

DETAILED DESCRIPTION OF THE PREFERRED EMBODIMENTS

Figures 1A, 1B:
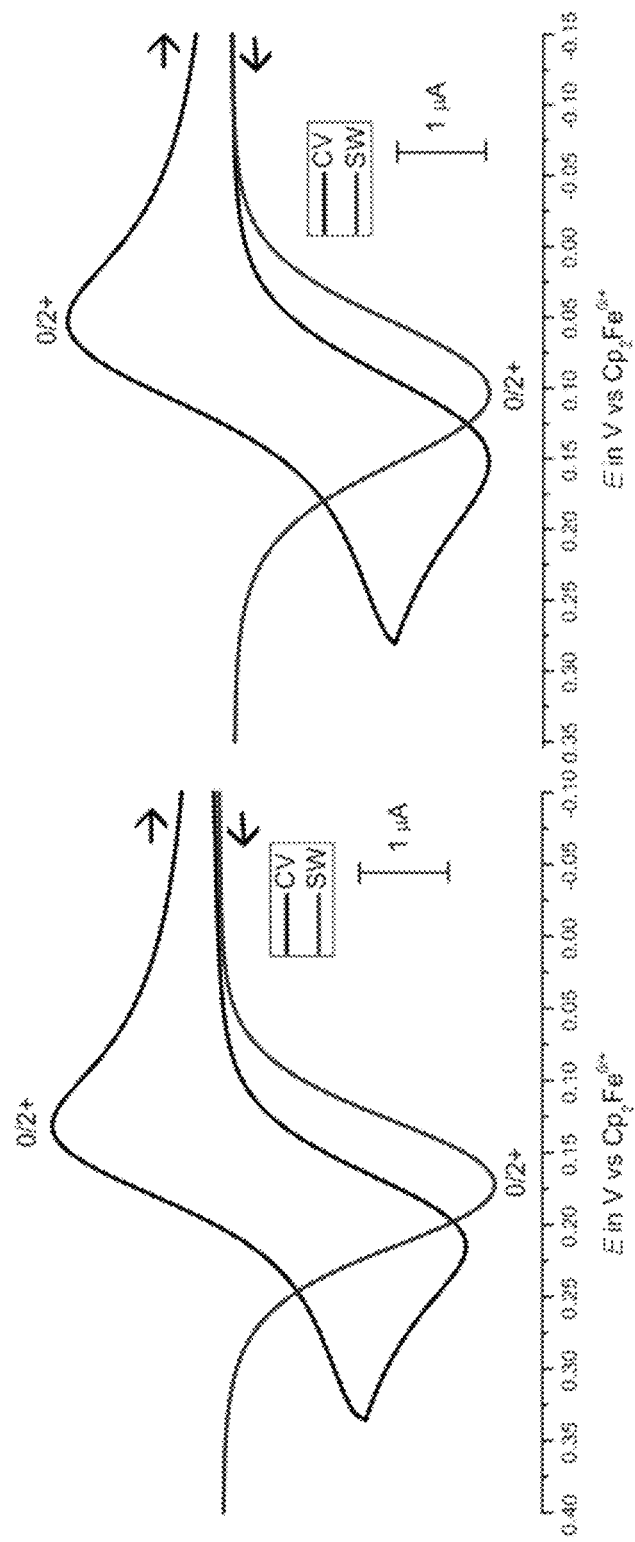
FIGS. 1A and 1B show Cyclic (upper) and square-wave (lower) voltammograms of complex [dRuazobz] vs. Cp$_2$Fe$^{0/+}$ in CH$_2$Cl$_2$/n-NBu$_4$PF$_6$ (FIG. 1A) and NBu$_4$TFPB (FIG. 1B) at a scan rate v=0.1 V s$^{-1}$ or at step potential of 4 mV and a frequency of 15 Hz.

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to an electronically weakly coupled novel 4,4'-divinylazobenzene-bridged diruthenium complex bearing two Ru(CO)Cl(P$^i$Pr$_3$)$_2$ moieties [dRuazobz] with the general formula [{Ru(CO)Cl(P$^i$Pr$_3$)$_2$}$_2$ (μ—{CH=CH—C$_6$H$_4$}$_2$—N=N-4,4')], [dRuazobz].

This five-coordinated, square-pyramidal, 16-valence electrons (VeEs) type-complex [dRuazobz] was classically prepared by regio- and stereospecific insertion of two equivalent of the ruthenium-hydrido precursor HRu(CO)Cl(P$^i$Pr$_3$)$_2$ into the two terminal —C≡CH bonds of the corresponding 4,4'-diethynylazobenzene in CH$_2$Cl$_2$ in a stoichiometric ratio of 2:1. Upon addition of the free 4,4'-diethynylazobenzene, the dark orange solution of the hydrido complex turned immediately deep red, confirming the formation of the corresponding ruthenium-alkenyl complex. This "hydroruthenation" reaction routinely proceeds in an anti-Markovnikov style.

The required 4,4'-diethynylazobenzene can be accessibly prepared by a three-step sequence involving firstly classical homo-oxidative cross-coupling of aryl diazonium salt using a Cu-catalyzed Sandmeyer-style reaction, traditional Pd/Cu catalyzed Sonogashira cross-coupling with trimethylsilylacetylene (TMSA), and subsequent desilylation of the two protecting $Me_3Si$ (TMS) groups according to classical procedures. This five coordinated, square pyramidal, 16-valence electrons (VEs) complex [dRuazobz] contains two $\{Ru(CO)Cl(P^iPr_3)_2(CH=CH)\}=\{Ru\}$ end-groups that are linked by an azobenzene bridge linker.

The complex [dRuazobz] was routinely characterized in the neutral state by classical IR, UV/Vis and NMR spectroscopy, and analytical techniques, and in its two different reachable oxidized states by IR and UV/Vis/NIR spectroelectrochemistry. The 4,4'-divinylazobenzene-bridged diruthenium complex bearing two $Ru(CO)Cl(P^iPr_3)_2$ moieties [dRuazobz] may function as a catalyst in organic processes. The product can be acquired in exceptional yields (average about 86%).

In an embodiment, the present subject matter relates to an electronically weakly coupled 4,4'-divinylazobenzene-bridged diruthenium complex bearing two $Ru(CO)Cl(P^iPr_3)_2$ moieties [dRuazobz] having the formula I:

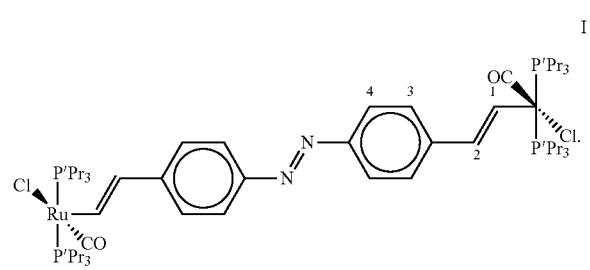

I

In certain embodiments, the 4,4'-divinylazobenzene-bridged diruthenium complex bearing two $Ru(CO)Cl(P^iPr_3)_2$ moieties [dRuazobz] can be obtained as a red solid.

In another embodiment, the present subject matter relates to a catalyst for organic reactions and processes.

In one more embodiment, the present subject matter relates to a method of making the 4,4'-divinylazobenzene-bridged diruthenium complex bearing two $Ru(CO)Cl(P^iPr_3)_2$ moieties [dRuazobz], the method comprising: stirring $HRu(CO)Cl(P^iPr_3)_2$ in $CH_2Cl_2$ to obtain a first reaction mixture; adding to the first reaction mixture to a solution of 4,4'-diethynylazobenzene in $CH_2Cl_2$ to obtain a second reaction mixture; stirring the second reaction mixture for at least about 1 hour; removing the $CH_2Cl_2$ under reduced pressure to obtain a precipitate; washing, filtering, and drying the precipitate; and obtaining the 4,4'-divinylazobenzene-bridged diruthenium complex bearing two $Ru(CO)Cl(P^iPr_3)_2$ moieties.

The present production methods can be further seen by referring to the following Scheme 1:

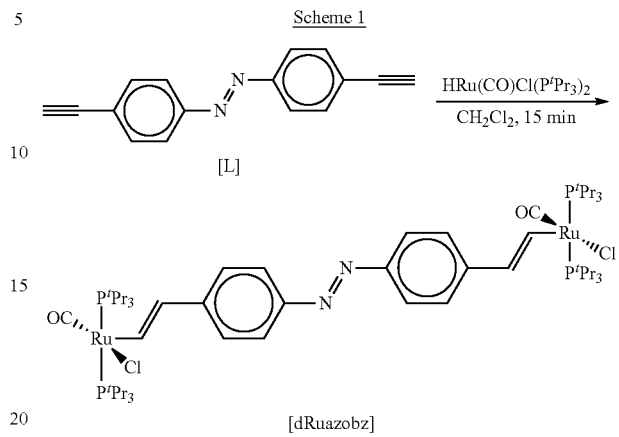

In an embodiment of the present production methods, the precipitate can be red.

In another embodiment of the present production methods, the precipitate can be washed with n-hexane and MeOH.

In a further embodiment of the present production methods, the precipitate can be dried in a vacuum.

In another embodiment of the present production methods, washing the precipitate may remove unreacted starting materials.

In another embodiment of the present production methods, the 4,4'-divinylazobenzene-bridged diruthenium complex bearing two $Ru(CO)Cl(P^iPr_3)_2$ moieties [dRuazobz] can be obtained as a red solid.

In an additional embodiment of the present production methods, the 4,4'-divinylazobenzene-bridged diruthenium complex bearing two $Ru(CO)Cl(P^iPr_3)_2$ moieties [dRuazobz] can be obtained in an about 86% yield.

The following examples relate to various methods of manufacturing the specific compounds and application of the same, as described herein. All compound numbers expressed herein are with reference to the synthetic pathway figures shown above.

EXAMPLES

Example 1

Preparation of 4,4'-diiodoazobenzene

Aniline (0.07 mmol) was suspended in 20 mL HCl and 50 mL water. At 0° C. the amine group was diazotized by slowly adding a solution of $NaNO_2$ (5.8 g, 0.08 mol, 1.2 eq.) in 25 mL water. After stirring the mixture at 0° C. for 1 hr, the solution was carefully transferred via a cannula into a freshly prepared solution of $CuSO_4 \cdot 5H_2O$ (34.7 g, 0.14 mol, 2.0 eq.), $NH_4OH$ (75 mL, 0.48 mmol, 6.9 eq.), $NH_2OH$ (10.3 g, 0.15 mmol, 2.1 eq.) and 5 g of NaOH in 50 mL water. Then stirring was continued at 25° C., and the reaction mixture was heated up to 70° C. for 1 hr. The resulting mixture was cooled down and acidified with 25 mL HCl (37%). The crude residue was taken up in a mixture of $CH_2Cl_2$ and distilled water and the organic layer was extracted three times with $CH_2Cl_2$. The combined organic layers were dried over $MgSO_4$ and the solvent was evaporated in vacuo. Purification by column chromatography (eluent: petroleum ether/dichloromethane, 5:1) gave the desired 4,4'-diiodoazobenzene as an orange crystalline solid.

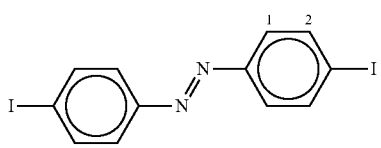

$^1$H-NMR (400 MHz, CDCl$_3$): δ 7.87 (d, 4H, 3 $J_{H(1)-H(2)}$ =8.6 Hz, H (1)), 7.64 (d, 4H, $^3J_{H(2)-H(1)}$=8.6 Hz, H$_{(2)}$) ppm.

Example 2

Preparation of 4,4'-bis((trimethylsilyl)ethynyl)azobenzene

A degassed solution of 4,4'-diiodoazobenzene (0.9 mmol), triphenylphosphine (3 mol %) and 0.4 mL (2.7 mmol, 3 eq.) of excess trimethylsilylacetylene (TMSA) in dry 15 mL trimethylamine was added to a mixture of CuI (10 mol %) and PdCl$_2$(PPh$_3$)$_2$ (5 mol %) in 15 mL THF. The resulting mixture was stirred and heated to reflux overnight. Additional amounts of TMSA were added to ensure complete consumption of the starting material (TLC control). When the reaction was finished, the solvent was evaporated under vacuum and the residue was taken up in 5 mL CH$_2$Cl$_2$ and filtered over silica gel. Purification by column chromatography (eluent: petroleum ether/dichloromethane, 9:1) gave the desired 4,4'-bis((trimethylsilyl)ethynyl)azobenzene as an orange crystalline solid.

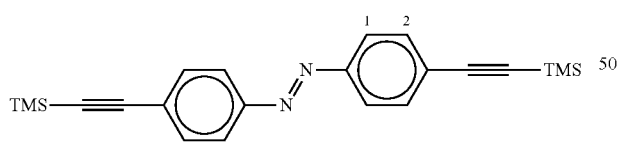

$^1$H-NMR (400 MHz, CDCl$_3$): δ 7.86 (d, 4H, 3 $J_{H(1)-H(2)}$ =8.4 Hz, H$_{(1)}$), 7.60 (d, 4H, 3 $J_{H(2)-H(1)}$=8.4 Hz, H$_{(2)}$) ppm, 0.28 (s, 18H, 2SiMe$_3$) ppm.

Example 3

Preparation of 4,4'-diethynylazobenzene 4,4'-Bis((trimethylsilyl)ethynyl)azobenzene (1.0 mmol) was dissolved in a methanol/THF mixture (10 ml/10 ml) and excess potassium carbonate (346 mg, 2.5 mmol, 2.5 eq.) was added. The completeness of the reaction was controlled via TLC (1 hr). After full conversion, the solvent was evaporated under vacuum. The crude residue was taken up in a mixture of CH$_2$Cl$_2$ and distilled water and the organic layer was extracted three times with CH$_2$Cl$_2$. The combined organic layers were dried over MgSO$_4$ and the solvent was removed in vacuo to provide the desired 4,4'-diethynylazobenzene as an orange solid.

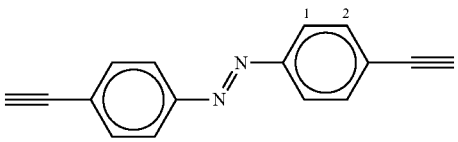

The synthetic scheme can be found in Scheme 2:

Scheme 2

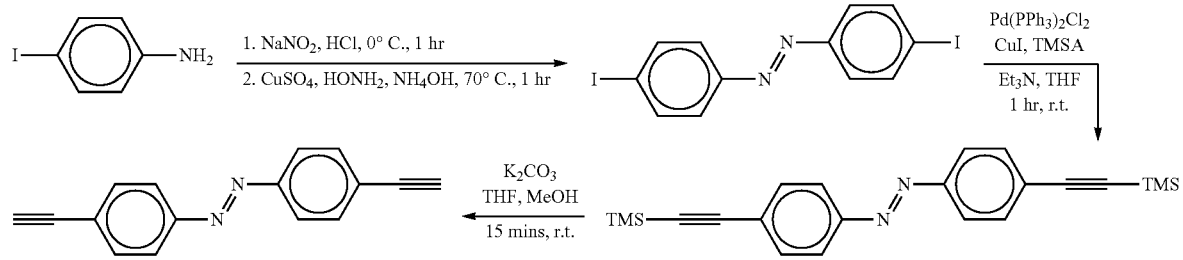

Figure 4:
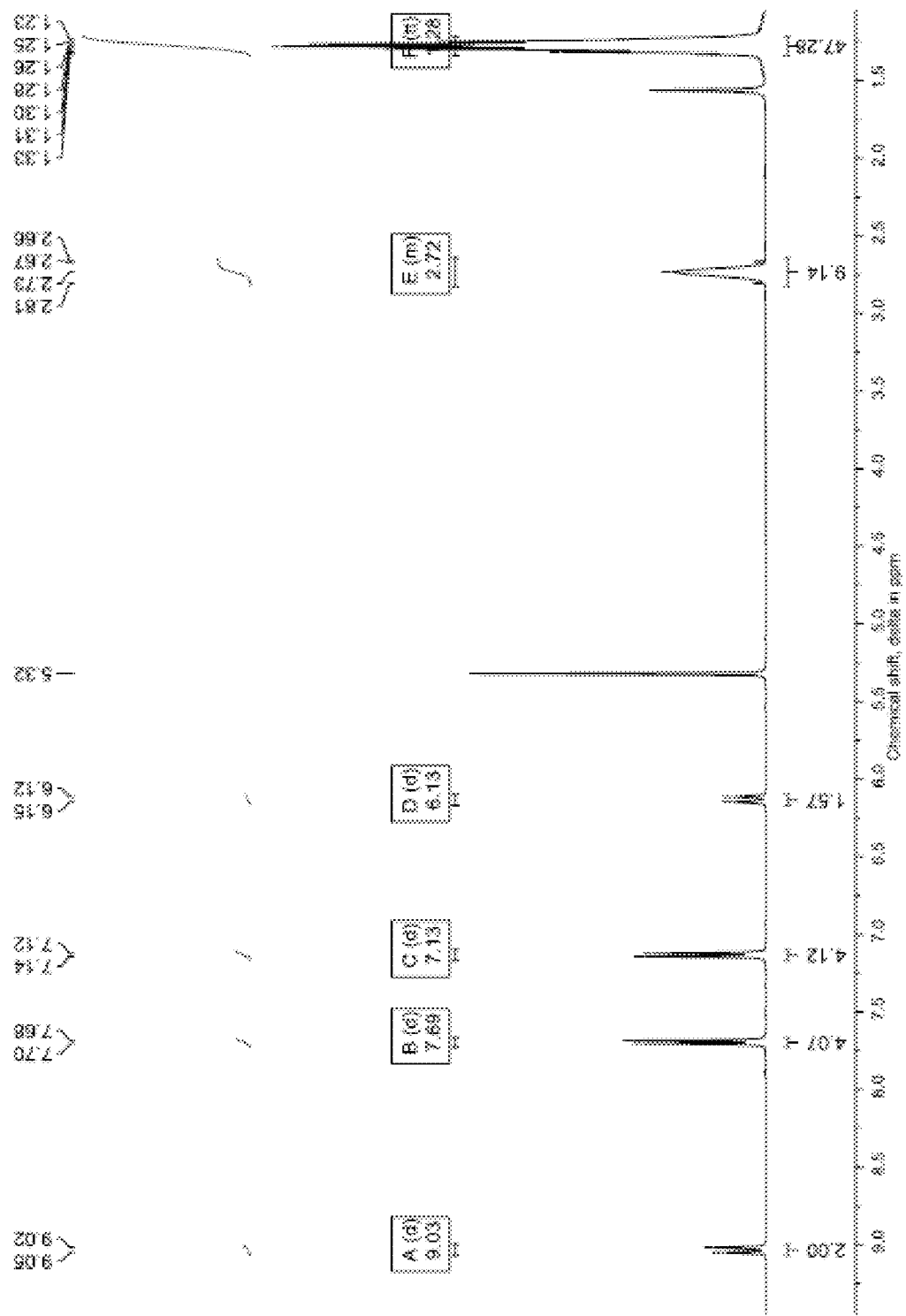
FIG. 4 shows $^1$H-NMR spectrum (162 MHz, CD$_2$Cl$_2$) of the complex [dRuazobz].
Figure 5:
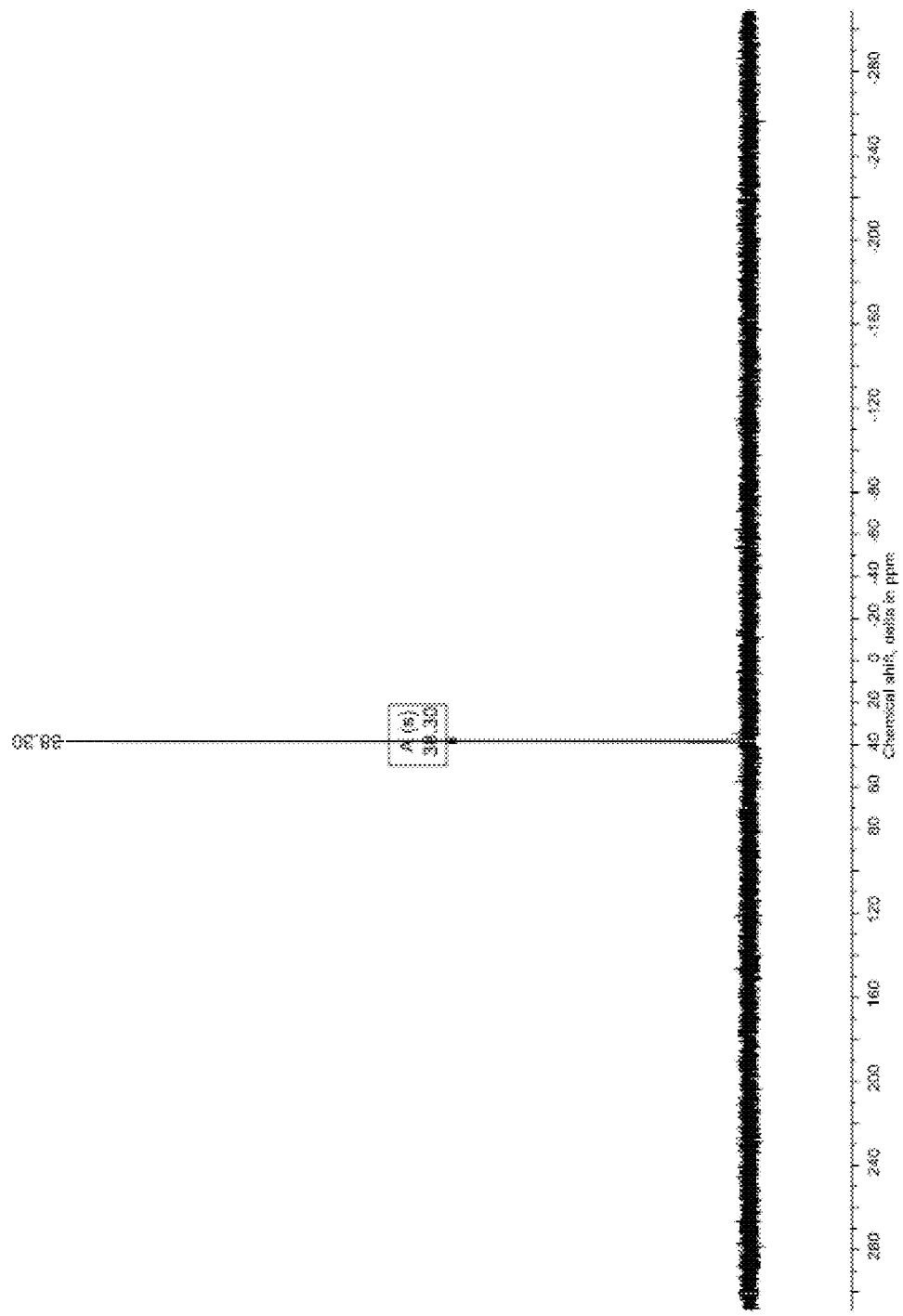
FIG. 5 shows $^{31}$P-NMR spectrum (162 MHz, CD$_2$Cl$_2$) of the complex [dRuazobz].

Characterization of the prepared compound was determined using $^1$H NMR and $^{31}$P-NMR as shown in FIGS. 4 and 5, respectively. The elemental analysis can be seen as follows.

Elemental analysis for C$_{16}$H$_{10}$N$_2$:C: 83.46; H: 4.38; N: 12.17. Found: C: 82.76; H: 4.42; N: 12.12%. UV-Vis (λmax (nm), ε (M−1·cm-1)): 240 (1.4·10$^4$), 351 (2.9·10$^4$), 450 (1.5·10$^4$). 1H-NMR (400 MHz, CDCl$_3$): δ 7.89 (d, 4H, $^3J_{H(1)-H(2)}$=8.4 Hz, H$_{(1)}$), 7.64 (d, 4H, 3 $J_{H(2)-H(1)}$=8.4 Hz, H$_{(2)}$), 3.24 (s, 2H, 2HC≡C) ppm.

Example 4

Preparation of 4,4'-divinylazobenzene-bridged diruthenium complex bearing two Ru(CO)Cl(P$^i$Pr$_3$)$_2$ moieties [dRuazobz]

To a stirred solution of HRu(CO)Cl(P$^i$Pr$_3$)$_2$ (200 mg, 0.42 mmol, 1 eq.) in 5 mL of CH$_2$Cl$_2$ was slowly added via cannula a solution of the 4,4'-diethynylazobenzene (0.25 mmol, 0.6 eq.) in 5 mL of CH$_2$Cl$_2$. Upon addition, the color of the solution changed immediately from pale orange to deep red. The reaction mixture was stirred for an additional hour and the solvent was removed under reduced pressure. The crude pink precipitate was washed with 15 ml of n-hexane and 15 ml of MeOH to remove the unreacted starting material, then filtered and dried in vacuo to give the product as a red solid.

Characterization of the prepared compound was determined using $^1$H NMR and $^{31}$P-NMR. The elemental analysis can be seen as follows.

29.9 mg (0.13 mmol, 0.6 eq.) of 4,4'-diethynylazobenzene yielded 108 mg (0.09 mmol, 86%) of complex [dRuazobz]. Elemental analysis for C$_{64}$H$_{96}$Cl$_2$N$_2$O$_2$P$_4$Ru$_2$:C: 53.95; H:

8.05; N: 2.33. Found: C: 54.77; H: 8.18; N: 2.30%. UV-Vis (λmax (nm), ε ($M^{-1} \cdot cm^{-1}$)): 230 (3.2.10$^4$), 276 (2.4.10$^4$), 492 (4.4.10$^4$). IR (ATR, ν in $cm^{-1}$): 2958, 2919 (C—H aryl, vinyl); 1908 (CO); 1596, 1567, 1470 (C=C aryl, vinyl); 1529 (N=N). $^1$H-NMR (400 MHz, $CD_2Cl_2$): δ 9.03 (d, 2H, 3 $J_{H(1)-H(2)}$=13.2 Hz, $H_{(1)}$), 7.69 (d, 4H, $^3J_{H(3)-H(4)}$=8.4 Hz, $H_{(3)}$), 7.13 (d, 4H, $^3J_{H(4)-H(3)}$=8.4 Hz, $H_{(4)}$), 6.13 (dt, $^3J_{H(2)-H(1)}$=13.3 Hz, $^4JH_{(2)-P}$=2.4 Hz, $H_{(2)}$), 2.80 (m, 12H, CHP($CH_3$)$_2$), 1.28 (m, 72H, ($CH_3$)$_2$PCH) ppm. $^{31}$PNMR (162 MHz, $CD_2Cl_2$): δ 38.30 (s, P$^i$Pr$_3$) ppm.

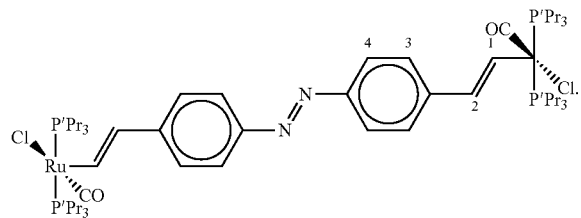

Example 5

NMR Characterization

NMR Characterization

To investigate the electrochemical electronic coupling, polyelectrochroic behavior, catalytic activity and spectro(electro)scopic features of bis(ruthenium-alkenyl) moieties incorporated into azobenzene bridge linker, a novel 4,4'-divinylazobenzene-bridged diruthenium complex bearing two Ru(CO)Cl(P$^i$Pr$_3$)$_2$ entities with the general formula [{Ru(CO)Cl(P$^i$Pr$_3$)$_2$}$_2$(μ—{CH=CH—C$_6$H$_4$}$_2$—N=N-4, 4')], [dRuazobz] was prepared, where the two ruthenium-vinyl end-groups are incorporated into the two para-positions on the azobenzene as depicted in Schemes 1 and 2, above.

The five-coordinated, square-pyramidal, bis(ruthenium-alkenyl) type-complex [dRuazobz] was classically prepared by in high yields by substitution of the regio- and stereo-elective insertion of two equivalent of the hydrido complex HRu(CO)Cl(P$^i$Pr$_3$)$_2$ into the two terminal —C≡CH bonds of the corresponding 4,4'-diethynylazobenzene in $CH_2Cl_2$ in a stoichiometric ratio of 2:1. Upon addition of the free 4,4'-diethynylazobenzene, the dark orange solution of the hydrido complex turned immediately deep red, confirming the formation of the corresponding ruthenium-alkenyl complex. This extraordinarily quantitative reaction is being denoted as "hydroruthenation" and routinely proceeds in an anti-Markovnikov style. The required 4,4'-diethynylazobenzene was accessibly prepared as depicted in Scheme 2 by a three-step sequence involving firstly classical homo-oxidative cross-coupling of aryl diazonium salt using Cu-catalyzed Sandmeyer-style reaction, traditional Pd/Cu catalyzed Sonogashira cross-coupling with trimethylsilylacetylene (TMSA) and subsequent desilylation of the two protecting Me$_3$Si (TMS) groups according to classical procedures. This five coordinated, square pyramidal, 16-valence electrons (VEs) complex [dRuazobz] in Scheme 1, contains two {Ru(CO)Cl(P$^i$Pr$_3$)$_2$(CH=CH)} ={Ru} end-groups that are linked by an azobenzene bridge linker. Complex [dRuazobz] was routinely characterized in the neutral state by conventional IR, UV/Vis and NMR spectroscopy and analytical techniques, and in its two different reachable oxidized states by IR, UV/Vis/NIR spectroelectrochemistry.

The identity of 4,4'-diethynylazobenzene and its corresponding bis(ruthenium-alkenyl) complex [dRuazobz] follows the correct numbers and integrations of the $^1$H-NMR data. A complete set of the NMR spectra ($^1$H- and $^{31}$P-) of all precursors and complex [dRuazobz] were obtained. In the $^{13}$P-NMR spectra, complex [dRuazobz], likewise other ruthenium-alkenyl of similar family, showed a sharp singlet resonance at δ=38.3 ppm, confirming that the four P$^i$Pr$_3$ ligands are chemically equivalent in which two of them are trans-disposed at each {Ru} end-groups. $^1$H-NMR spectrum shows a sharp singlet of the two equivalent terminal ethynyl protons for the free alkyne at 6=3.2 ppm while one set of the resonance signals at δ 2.8 ppm and δ 1.3 ppm for the methine CHP($CH_3$)$_2$ and methyl ($CH_3$)$_2$PCH protons of the four equivalent P$^i$Pr$_3$ ligands, respectively in complex [dRuazobz]. The latter also showed a classical doublet at δ 9.03 ppm and doublet of triplet at δ 6.13 ppm of the four equivalent vinylic protons Ru—CH=($H_1$) and Ru—CH=CH ($H_2$) with a large coupling constant $^3J_{H-H}$ of about 13.3 Hz, respectively. This high coupling constant confirms a trans-geometry at the two vinylic double bonds resulting from cis-insertion of the 4,4'-diethynylazobenzene into the Ru—H bond in a regio- and stereospecific manner.

Electrochemistry

The redox behavior of azobenzene-bridged bis(ruthenium-vinyl) complex [dRuazobz] was initially scrutinized by cyclic voltammetry (CV) and square-wave voltammetry (SWV) techniques to probe the electrochemical properties and the extend of the electronic interaction (coupling) between the two ruthenium vinyl moieties. The experiments were performed in $CH_2Cl_2$/n-NBu$_4^+$PF$_6^-$ (0.1 M) or NBu$_4^+$TFPB$^-$TFPB$^-$ =B[{(C$_6$H$_3$(CF$_3$)$_2$–3,5}]$_4$) (0.1 M) as the supporting electrolyte. The latter electrolyte was employed here because of its very weakly coordinating TFPB anion, which usually enhances the splitting of the two close redox-waves as it interacts very weakly with the positive charges generated on stepwise oxidation. FIGS. 1A-1B show the CV and SWV of the complex [dRuazobz] in n-NBu$_4^+$PF$_6^-$ (FIG. 1A) or NBu$_4^+$TFPB$^-$ (FIG. 1B) recorded at a sweep rate of 0.1 V/s at r.t. versus the CP$_2$Fe$^{0/+}$ reference couple. Complex [dRuazobz] undergoes a single chemically and electrochemically reversible two-electrons oxidation redox wave at 172 mV versus the CP$_2$Fe$^{0/+}$ reference couple scale, which refers to noteworthy negligible communication between the two remote redox-active end-groups. Attempts to separate the two redox waves failed even by using the NBu$_4^+$TFPB$^-$ electrolyte.

IR Spectro-Electrochemistry

Figures 2A, 2B:
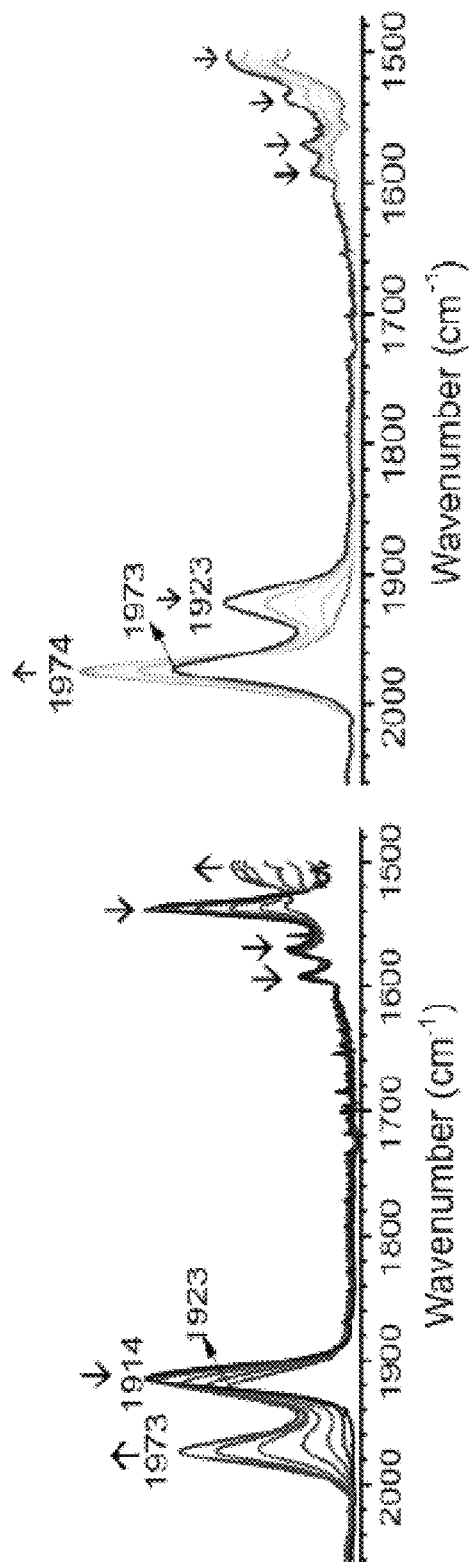
FIGS. 2A and 2B show IR spectroscopic changes upon the first (FIG. 2A) and the second oxidation (FIG. 2B) of the complex [dRuazobz] in CH$_2$Cl$_2$/NBu$_4$PF$_6$.

IR spectroelectrochemistry (SEC) is a quantitative and an informative tool used in this study to try to separate the two individual redox processes and to get a crucial insight into the ruthenium-versus divinylazobenzene bridge-based character of the individual redox processes. This can be fulfilled via investigating the changes in the energies and the band patterns for the degree of metal dπ/π*(CO) backbonding upon accessible sequential oxidations, since those remarkable tokens are considered as an indicative measure of altering the electron density at the two ruthenium-vinyl moieties. Complex [dRuazobz], in its neutral state, shows classical intense vibrational bands at around 2950, 1914, 1550, and 1530 $cm^{-1}$ assigned to the C—H(aryl, alkyl), Ru(C≡O), C=C (vinyl, aryl), and N=N stretches, respectively. This low energy of the ν (CO) stretch band reflects, however, the high electron density at the two ruthenium-alkenyl moieties. First and second oxidations of complex [dRuazobz] cleanly converted the neutral species to their corresponding mono- and di-cation in a stepwise fashion as indicated by distinct sets of isosbestic points. First radical cations of complex [dRuazobz] led to gradually replace the neutral Ru(CO) band at around 1914 cm$^{-1}$ into a pattern of two bands: a lower energy shoulder band with a very slight shift band at 1923 cm$^{-1}$ and another high energy band at 1973 cm$^{-1}$ as illustrated in FIGS. 2A and 2B. As the oxidation proceeded to the di-cation, the two CO bands of mixed-valent (MV) complex [dRuazobz] blued-shifted and merged into a single band at 1974 cm$^{-1}$. This typical observation pattern confirms a weakly coupled Class I system of Robin-Day classification of MV states.

UV/Vis/NIR Spectroelectrochemistry

Figures 3A, 3B:
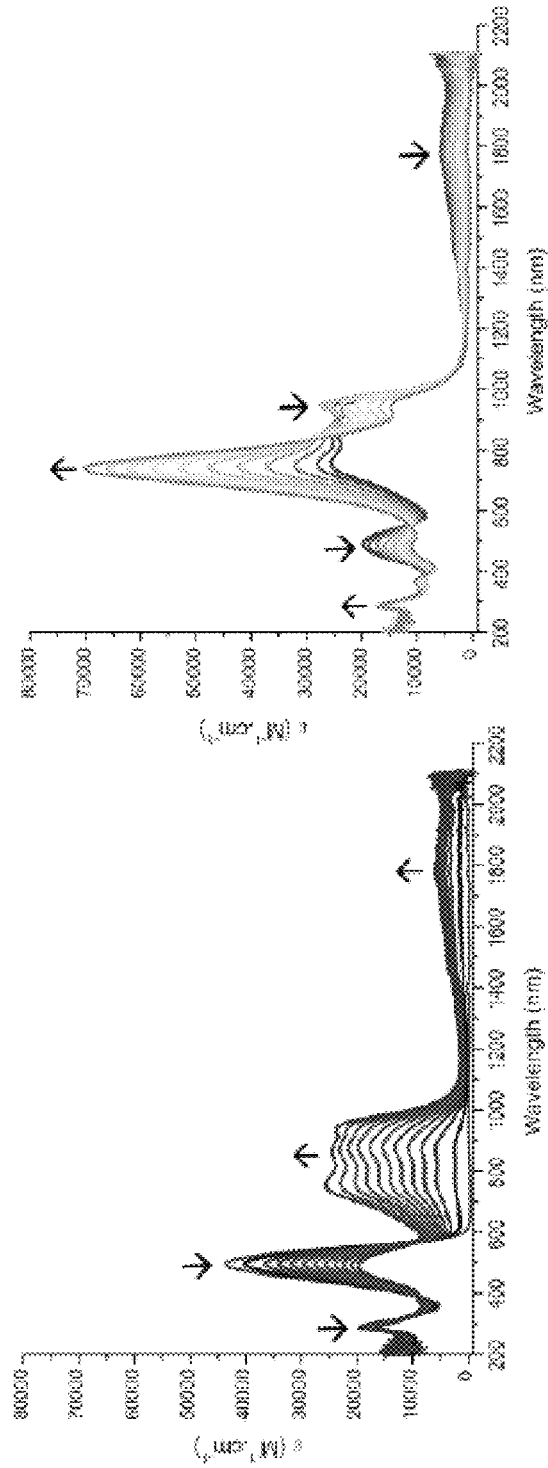
FIGS. 3A and 3B show UV/Vis/NIR spectroscopic changes during the first and the second oxidation of the [dRuazobz] in CH$_2$Cl$_2$/NBu$_4$PF$_6$.

Likewise all five-coordinated bis(ruthenium-alkenyl) complexes of the type {Ru}-arylene-{Ru} ({Ru}={Ru (CO)Cl(P$^i$Pr$_3$)$_2$(CH=CH)}), complex [dRuazobz] as depicted in FIGS. 3A and 3B, features a main intense absorption UV-band at 492 nm which attributed to $\pi \rightarrow \pi^*$ transitions within the extended metal-organic divinylarylene bridge chromophore. Electrochemical oxidation was achieved by applying appropriate positive potentials to the complex [dRuazobz] in NBu$_4^+$PF$_6^-$/CH$_2$Cl$_2$ in the UV/Vis/ NIR regimes. Upon the first oxidation, the intensity of the Vis-band of the neutral complex collapsed with the concomitant of growth of a new intense band at the border of Vis/NIR region at 800 nm and weak shoulder between 1400 to 2100 nm. The border Vis/NIR band is assigned to a $\pi \rightarrow \pi^*$ transition within an open-shell, extended $\pi$-system. The same scenario was observed as the oxidation proceeded to [dRuazobz]$^{2+}$, except for a collapsed shoulder between 1400 to 2150 nm.

It is to be understood that the 4,4'-divinylazobenzene-bridged diruthenium complex bearing two Ru(CO)Cl (P$^i$Pr$_3$)$_2$ entities, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A 4,4'-divinylazobenzene-bridged diruthenium complex bearing two Ru(CO)Cl(P$^i$Pr$_3$)$_2$ moieties having the formula I:

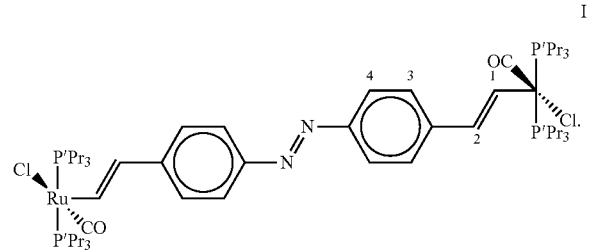

2. The 4,4'-divinylazobenzene-bridged diruthenium complex bearing two Ru(CO)Cl(P$^i$Pr$_3$)$_2$ moieties of claim 1, wherein the compound is obtained as a red solid.

3. The 4,4'-divinylazobenzene-bridged diruthenium complex bearing two Ru(CO)Cl(P$^i$Pr$_3$)$_2$ moieties of claim 1, wherein the compound is a catalyst.

4. A method of making the 4,4'-divinylazobenzene-bridged diruthenium complex bearing two Ru(CO)Cl (P$^i$Pr$_3$)$_2$ moieties of claim 1, the method comprising:

stirring HRu(CO)Cl(P$^i$Pr$_3$)$_2$ in CH$_2$Cl$_2$ to obtain a first reaction mixture;

adding to the first reaction mixture a solution of 4,4'-diethynylazobenzene in CH$_2$Cl$_2$ to obtain a second reaction mixture;

stirring the second reaction mixture for at least about 1 hour;

removing the CH$_2$Cl$_2$ under reduced pressure to obtain a precipitate;

washing, filtering, and drying the precipitate; and obtaining the 4,4'-divinylazobenzene-bridged diruthenium complex bearing two Ru(CO)Cl(P$^i$Pr$_3$)$_2$ moieties.

5. The method of making the 4,4'-divinylazobenzene-bridged diruthenium complex bearing two Ru(CO)Cl (P$^i$Pr$_3$)$_2$ moieties of claim 4, wherein the precipitate is red.

6. The method of making the 4,4'-divinylazobenzene-bridged diruthenium complex bearing two Ru(CO)Cl (P$^i$Pr$_3$)$_2$ moieties of claim 4, wherein the precipitate is washed with n-hexane and MeOH.

7. The method of making the 4,4'-divinylazobenzene-bridged diruthenium complex bearing two Ru(CO)Cl (P$^i$Pr$_3$)$_2$ moieties of claim 4, wherein washing the precipitate removes unreacted starting materials.

8. The method of making the 4,4'-divinylazobenzene-bridged diruthenium complex bearing two Ru(CO)Cl (P$^i$Pr$_3$)$_2$ moieties of claim 4, wherein the precipitate is dried in a vacuum.

9. The method of making the 4,4'-divinylazobenzene-bridged diruthenium complex bearing two Ru(CO)Cl (P$^i$Pr$_3$)$_2$ moieties of claim 4, wherein the 4,4'-divinylazobenzene-bridged diruthenium complex bearing two Ru(CO)Cl (P$^i$Pr$_3$)$_2$ moieties is obtained as a red solid.

10. The method of making the 4,4'-divinylazobenzene-bridged diruthenium complex bearing two Ru(CO)Cl (P$^i$Pr$_3$)$_2$ moieties of claim 4, wherein the 4,4'-divinylazobenzene-bridged diruthenium complex bearing two Ru(CO)Cl (P$^i$Pr$_3$)$_2$ moieties is obtained in an about 86% yield.

* * * * *